Feb. 7, 1950     E. M. MOFFATT     2,496,807
GAS PROBE OF THE THERMOCOUPLE TYPE
Filed Dec. 18, 1946
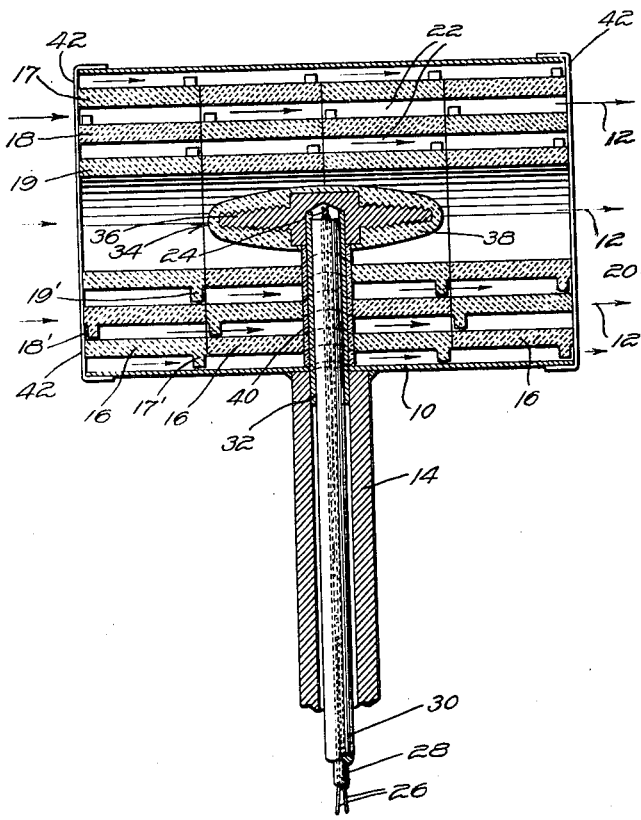
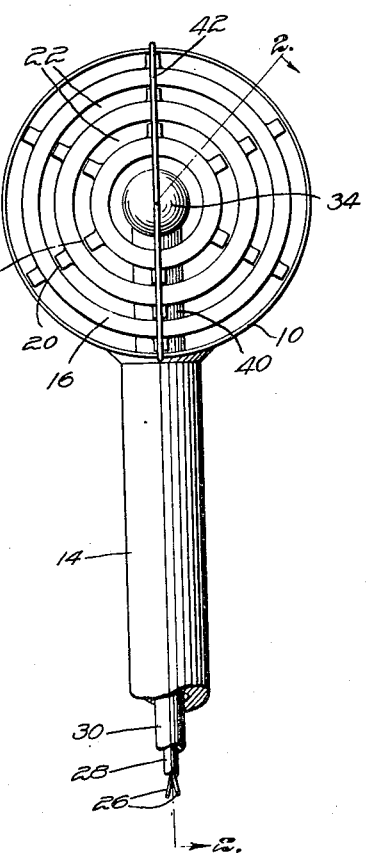
INVENTOR
Elbert Marston Moffatt
BY Charles A. Warren
ATTORNEY Patented Feb. 7, 1950

2,496,807

UNITED STATES PATENT OFFICE 2,496,807

GAS PROBE OF THE THERMOCOUPLE TYPE

Elbert Marston Moffatt, Glastonbury, Conn., assignor to United Aircraft Corporation, East Hartford, Conn., a corporation of Delaware Application December 18, 1946, Serial No. 716,934

2 Claims. (Cl. 136—4)

The present invention relates to a gas probe for the purpose primarily of measuring the temperature of hot gas in a stream.

Gas probes have been made up of a number of concentric tubes positioned one within another with the thermocouple element located substantially midway of the innermost tube. The tubes function to reduce the loss of heat from the thermocouple by radiation to surrounding surfaces such as the walls of the duct in which the thermocouple is positioned. Such concentric tubes must be supported one within the other and the interconnections permit a loss of heat by conduction so that the innermost shell does not generally reach the temperature of the gas flowing through it. It is also difficult in the measurement of extremely high temperatures of gas to maintain the metallic tubes in predetermined relation to each other by reason of the tendency of the metal of the tubes to lose substantially all of its strength at elevated temperatures. A feature of this invention is to overcome the objections above noted by the use of ceramic or refractory shields instead of the metallic tubes. Another feature is the support of the ceramic shields so that they will be loaded in compression.

For the purpose of additionally increasing the accuracy of the probe, a feature of the invention is the mounting of the junction block of the thermocouple in a ceramic-covered element.

Other objects and advantages will be apparent from the specification and claims, and from the accompanying drawings which illustrate an embodiment of the invention.

Fig. 1 is an end view of the probe.

Fig. 2 is a sectional view substantially on line 2—2 of Fig. 1.

As best shown in Fig. 2 the probe consists of a metallic framework including a cylindrical sleeve or shield 10 having its axis substantially parallel to the flow of gas as represented by the arrows 12 and a supporting stem or tube 14 also preferably metallic which may be welded or otherwise permanently attached to the sleeve.

Mounted within the sleeve 10 are a number of ceramic or refractory blocks 16 each of which consists of a series of concentric ceramic rings spaced apart by webs 17', 18' and 19' as shown. The outermost ring is held in spaced relation to the sleeve 10 by the webs 17' and the other rings are spaced from the outermost ring to define gas paths through the ceramic elements and through the entire probe structure. When the several ceramic blocks 16 are assembled in position as shown, the rings 17, 18 and 19 are in alignment with the similar rings of the other blocks and define substantially cylindrical passages 22 through which the hot gas flows. The angularly spaced webs permit differential expansion of the rings which will occur during use of the probe at high temperatures. The several rings 17 abut one another endwise to form a sleeve which is spaced from the sleeve 10 by the spacers 17'. Similarly the rings 18 form a sleeve concentric to and within the sleeve formed by rings 17 and spaced from the rings by the spacers 18'. This arrangement permits a flow of gas between the rings of each block and the spacers are so arranged as to interfere only slightly with the gas flow through the probe.

The thermocouple element 24 is supported on the pair of wires 26 located in a ceramic tube 28 within a metallic tube 30 all fitting within the hollow stem 14 of the probe. The inner end of the tube 30 may be guided by another metallic tube 32 which is supported at one end in the stem 14 and which at its other end carries a junction block 34 in the form of a metallic skeleton 36 embedded in a ceramic 38. The tube 32 may be externally shielded by a ceramic covering 40 also in the form of a tube to prevent the hot gases from coming in contact with it.

The ceramic blocks 16 may be held in place by wires 42 extending across the ends of the sleeve 10, thus avoiding the necessity for cementing the blocks in place which might cause cracking because of differential expansion.

With a probe of this character, the innermost rings will reach a higher temperature than the surrounding rings and may reach a temperature higher than the melting point of the material of sleeve 10. The sleeve will remain cool enough even in a gas of such temperature by reason of the radiation of a substantial part of its heat to the walls of the duct.

Although the structure is described as a probe, it will be understood that a similar principle of construction might be adapted to other purposes where it is desirable to attain high surface temperatures on a body in a gas stream surrounded by colder surfaces, as in the flame tube for a burner.

It is to be understood that the invention is not limited to the specific embodiment herein illustrated and described, but may be used in other ways without departure from its spirit as defined by the following claims.

I claim:

1. In a gas probe, a thermocouple junction, a tube supporting said thermocouple junction, a shield having its axis at a substantial angle to the tube and mounted on the tube with the junction located within the shield, and a ceramic lining for the shield, consisting of concentric spaced ceramic sleeves mounted within the shield, said sleeves each being built up of a number of ceramic elements in end-to-end relation, each element consisting of short spaced substantially concentric shields of ceramic material with integral spacers and means at the ends of the first shield to hold said elements axially in position.

2. In a gas probe, a thermocouple junction, a tube supporting said thermocouple junction, a shield having its axis at a substantial angle to the tube and mounted on the tube with the junction located within the shield, and a ceramic insert within the shield, consisting of concentric spaced ceramic sleeves mounted within the shield, said sleeves being built up of a number of ceramic elements in end-to-end relation, each element consisting of short spaced substantially concentric shields of ceramic material with integral spacers, the outermost concentric shield of each element being smaller than the main shield to fit therein in spaced relation.

ELBERT MARSTON MOFFATT.

REFERENCES CITED

The following references are of record in the file of this patent:

UNITED STATES PATENTS

| Number | Name | Date |
|---|---|---|
| 910,822 | Joel | Jan. 26, 1909 |
| 2,318,479 | Gillis | May 4, 1943 |

FOREIGN PATENTS

| Number | Country | Date |
|---|---|---|
| 5,868 | Great Britain | of 1899 |
| 190,657 | Great Britain | Dec. 28, 1922 |
| 320,194 | Great Britain | Oct. 10, 1929 |
| 353,371 | France | June 27, 1905 |

OTHER REFERENCES

Revere, Instruments, vol. 17 (1944), page 378.

Roeser et al., J. Research Bur. Stds., Oct. 1930, page 795.

King, W. J., Trans. A. S. M. E., July 1943, pages 426 and 427.

Schack, J. Jnst. Fuel, March 1939, page 837.